United States Patent
Thakur (10) Patent No.: US 11,363,064 B2
(45) Date of Patent: Jun. 14, 2022

(54) IDENTIFYING SPAM USING NEAR-DUPLICATE DETECTION FOR TEXT AND IMAGES

(71) Applicant: ADOBE INC., San Jose, CA (US)

(72) Inventor: Spandan Thakur, Bengaluru (IN)

(73) Assignee: Adobe Inc., San Jose, CA (US)

( * ) Notice: Subject to any disclaimer, the term of this patent is extended or adjusted under 35 U.S.C. 154(b) by 536 days.

(21) Appl. No.: 16/510,578

(22) Filed: Jul. 12, 2019

(65) Prior Publication Data
US 2021/0014270 A1 Jan. 14, 2021

(51) Int. Cl.
*H04L 9/30* (2006.01)
*H04L 29/06* (2006.01)
*H04L 9/40* (2022.01)
*G06F 16/14* (2019.01)

(52) U.S. Cl.
CPC ........ *H04L 63/1483* (2013.01); *G06F 16/152* (2019.01); *H04L 63/1466* (2013.01)

(58) Field of Classification Search
CPC ............. H04L 63/1483; H04L 63/1466; G06F 16/152
See application file for complete search history.

(56) References Cited

U.S. PATENT DOCUMENTS

| | | | |
|---|---|---|---|
| 2010/0205671 A1* | 8/2010 | Milliken | H04L 63/145 726/23 |
| 2017/0090760 A1* | 3/2017 | Kalipatnapu | G06F 3/0604 |
| 2018/0255010 A1* | 9/2018 | Goyal | H04L 63/1441 |
| 2020/0177942 A1* | 6/2020 | Wu | G06F 16/3347 |

OTHER PUBLICATIONS

Datasketch: Big Data Looks Small. First release: Apr. 12, 2016. Latest release: Jan. 6, 2019. Retrieved from the internet on Oct. 2, 2019 at <https://ekzhu.github.io/datasketch>. Abstract Only. 2 pages.
Imagehash: A Python Perceptual Image Hashing Module. First release: Nov. 1, 2016. Latest release: Mar. 19, 2018. Retrieved from the internet on Oct. 2, 2019 at <https://github.com/JohannesBuchner/imagehash>. Abstract Only. 2 pages.
Breakthrough/PySceneDetect: Phython and OpenCV-based scene cut/transition detection program & library. First release: Jan. 8, 2016. Latest release: Aug. 3, 2019. Retrieved from the internet on Oct. 2, 2019 at <https://github.com/Breakthrough/PySceneDetect>. Abstract Only. 3 pages.

* cited by examiner

*Primary Examiner* — Wasika Nipa
(74) *Attorney, Agent, or Firm* — Shook, Hardy & Bacon L.L.P.

(57) ABSTRACT

Embodiments described herein provide systems, methods, and computer storage media for detecting spam using by comparing hash values of content. In embodiments, hash values are generated based on the type of content and compared to other hash values in storage buckets. The similarity of content is determined by calculating the distance between two hash values and determining whether the distance exceeds a distance index. Counter values associated with hash values in storage are incremented when the distances between hash values exceed the distance index. Spam indications are communicated when the counter values for associated with hash values exceed a count threshold.

14 Claims, 7 Drawing Sheets

IDENTIFYING SPAM USING NEAR-DUPLICATE DETECTION FOR TEXT AND IMAGES

BACKGROUND

As workflows related to sharing, collaboration, and publishing of content increase, so does the frequency of spam and abuse. A majority of spammer activity revolves around groups of spammers (e.g., humans, botnets) sending identical or near identical content to a large number of recipients.

Some conventional methods for detecting spam use duplicate detection in conjunction with a spam classifier to enhance the ability to detect spam when the actual content of the image or text is the same as previously communicated content. Spammers, however, oftentimes modify or vary content being sent to recipients such that the exact same content is not being communicated or replicated for each recipient. As a result of such varied spam content, conventional methods for detecting spam can be insufficient. For example, performing spam classification using a machine learning algorithm can inadequately detect new content patterns when such patterns were not used during the training process, thereby resulting in inadequate identification of spam. Further, using duplication detection also results in inadequate identification of spam when the content is varied or modified from a previous content version. As such, despite spam detection efforts, spam in a varied content format can be overlooked and communicated to a user thereby resulting in a decrease in security and user dissatisfaction.

SUMMARY

Embodiments described herein involve identifying spam by matching content using hash values. In particular, hash values of content can be compared to detect duplicate and/or near duplicate content thereby increasing the likelihood to identify spam, even when the spam content is varied in format from prior spam content. At a high level, embodiments described herein generate hash values of content and compare hash values to determine matching content, thereby indicating spam. To the extent a threshold level of matching content exists, the content can be deemed to be spam. Instead of using machine learning classifiers that require large training datasets to classify content as spam, embodiments described herein utilize hashing algorithms to generate hash values and compare an extent of similarity between hash values. The extent of similarity between hash values generated for various content can indicate similarity or matching content because similar content will generate closer hash values. Advantageously, by comparing hash values of content instead of comparing actual content, embodiments described herein are able to operate more efficiently and scale properly as the amount of analyzed content increases.

Generally, embodiments enable spam detection using hash values to match content in accordance with duplicate matching techniques and/or near-duplicate matching techniques. To facilitate duplicate and near-duplicate matching techniques, hash values are generated for incoming content. Hash values of the incoming content can be compared with hash values in a closest mapped storage bucket to determine exact or similar hash values. Counter values associated with hash values in storage may be used in duplicate or near-duplicate matching to measure an extent to which matching content exists. The counter values associated with each hash value in storage along with counter expiration times indicate the rate at which content is observed over a period of time. When hash values with an associated counter value meet or exceed a count threshold, the related content can be flagged as spam.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Turning user-generated content into a safe source of high-quality assets is advantageous for many companies. However, the increase in content being shared and created online opens up more opportunities of fraud and abuse by bad actors. In this regard, spammers often target numerous recipients, such as users, consumers, and content providers, by sending large numbers of unsolicited bulk content. A majority of spam activity originates from groups of spammers (e.g., humans, botnets, etc.) sending identical or near identical content to a large number of recipients. With the increase in spamming efforts, content providers have begun moderating online activity to detect unwanted spam directed to content such as profanity in text, nudity in images, illegal download URLs, etc.

Conventional methods for detecting spam involve classifying the actual content of a message using machine learning based classifiers to determine if the content of the message contains undesirable content. However, using machine learning based classifiers to analyze and classify the actual content of an image or text to determine spam may not meet the performance requirements of real-time applications. In addition, because most general spam classifiers use trained machine learning algorithms, it is often difficult to detect new content patterns used by spammers as the new content patterns were not used while training the classifiers. Moreover, training machine learning classifiers to recognize distinct variations in the actual content of spam is an extensive process that requires voluminous and comprehensive datasets that are not readily accessible and are difficult to build, collect, and maintain. As a result, machine learning based classifiers are inefficient and often inaccurate when identifying spam.

To increase the efficiency and enhance the ability to detect spam, duplicate detection techniques may be used together with machine learning based classifiers. In particular, directly comparing incoming content against previous content can be an efficient way to determine that content is spam because the prior content has already been identified. In many cases, however, spam content may easily avoid duplicate detection methods if the content is modified, even slightly. For example, a spammer may alter the text of a message by a few characters or modify an image by slightly resizing, repositioning, or applying a different format, etc. As a result, existing duplicate detection techniques will not identify incoming content as a match to content observed in the past even though the actual content differs only marginally. Thus, while duplicate detection provides an extra layer of defense to identify spam when used along with a machine learning based classifier, the shortcomings of both approaches do not accurately and efficiently identify spam.

Additionally, conventional techniques for detecting spam do not scale properly as the amount of content that needs to be moderated increases. For example, a single content provider may need to examine millions of text or images each day to determine suitable content. Due to the sheer volume of data, many existing methods impede on a content provider's workflow when detecting spam. For example, if a user wants to add a comment to a particular image on a website, a traditional spam detection system may initially check the user's comment for any unwanted material before the website publishes the comment. These current approaches are often asynchronous, greatly affecting the speed at which incoming content is inspected and verified as legitimate.

Accordingly, embodiments described herein are directed to facilitating identification of spam by matching content using hash values. In particular, hash values of content are generated and compared to determine matching content, thereby indicating spam. At a high level, embodiments described herein use hash values of content to determine whether prior matching content exists. To the extent a threshold level of matching content exists, the content can be deemed to be spam. Instead of using machine learning classifiers that require large training datasets to classify content as spam, embodiments described herein utilize hashing algorithms to generate hash values and compare an extent of similarity between hash values. The extent of similarity between hash values generated for various content can indicate similarity or matching content because similar content will generate closer hash values. Advantageously, by comparing hash values of content instead of the actual content, embodiments described herein are able to operate more efficiently and scale properly as the amount of analyzed content increases.

Generally, to facilitate hash value comparisons, hash values are generated for incoming content. Such generated hash values may be stored into storage buckets which group similar hash values of content with a high probability that the content in a given storage bucket is similar. As such, hash values of new incoming content can be matched with hash values in the closest mapped storage bucket without checking every possible hash value in storage. Advantageously, comparing hash values to more relevant content by checking the closest hash values in the closest storage bucket increases efficiency and thereby scalability. In this regard, a real-time determination of spam can be made with a rapid turnaround time regardless of the amount of incoming content that requires spam detection.

Additionally, counter values may be used to measure an extent to which matching content exists. As described, content may be designated as spam when a threshold level of matching content exists. As such, counter values may be used to track an extent of matching content. In this way, client and/or global counter values associated with each hash value can maintain how many times specific content is observed. Upon identifying a content match (e.g., a hash value of received content matches a hash value in storage), both the client and global counter values can be increased for the associated hash value in storage. In implementations, entities may configure count thresholds and counter expiration values to fit particular needs. In some cases, counter values expire and reset if no update occurs within an entity defined expiration time. The counter values can then be used to identify or flag content as spam. For example, based on a rate at which content is analyzed across all entities and/or for specific entities over a period of time determined by counter expiration values, content may be identified and flagged as spam (e.g., hash values of content frequently observed indicate spam).

In operation, and in accordance with embodiments described herein, hash values are generated for incoming content (e.g., text and images). Initially, when incoming content is received, the content can be sorted into storage buckets to be utilized for matching content for future incoming content. Thereafter, when new incoming content is received, a hash value is generated and the storage bucket containing the closest hash values is queried to determine if matching content exists in the storage bucket. By storing the hash values of previously analyzed content in storage buckets and checking the storage bucket with the closest hash values, the amount of time needed to search for matching content is significantly reduced while maintaining accuracy. To determine the rate or frequency at which matching content is observed, counter values associated with content in the storage buckets are used to track matching content on a global scale and/or per entity requirement basis. In some implementations, client and global counter values are incremented each time matching content is determined. Such counter values can be used to determine or detect spam. For example, when a counter value associated with a hash value in storage exceeds a count threshold, the content can be identified or designated as spam.

As described herein, embodiments enable spam detection using hash values to match content in accordance with duplicate matching techniques and/or near-duplicate matching techniques. In this way, duplicate matching techniques can be applied to identify content that duplicates or replicates other content. Near-duplicate matching techniques can be applied to identify content that nearly duplicates other content, that is, is at least highly similar to other content. In some cases, both duplicate matching techniques and near-duplicate matching techniques may be used to efficiently detect spam. As one example, a duplicate matching technique may first be applied to detect spam and, if needed, a near-duplicate matching technique can be applied to detect spam.

In one embodiment, duplicate matching is performed by analyzing content in storage for an exact match using duplicate detection. Embodiments described herein create a hash value (e.g., md5 hash) for the received content to determine if the same hash value already exists in storage. Additionally, embodiments described herein also check if the exact match rate for a particular piece of content is above a certain count threshold taking into account the counter expiration values. A cache can be used to keep track of the content that is matched via counter values associated with each piece of content. In some embodiments, there is a global counter value that tracks content for all entities. In other embodiments, an entity-specific counter value keeps track of content specifically defined by an entity (e.g., a person, company, organization, or the like). In cases that a rate or frequency associated with an exact match counter value exceeds a certain count threshold in a defined expiration time, the content can be designated as spam.

Additionally or alternatively, near-duplicate matching can be performed to detect spam by analyzing content in storage for similar content using near-duplicate detection. Initially, the incoming content is received and a hash value is generated using any suitable hashing technique (e.g., MinHash using shingles of text, Perceptual hashing, etc.) based on the type of content. The hashing technique can generate a hash value for each piece of received content considering all the features/attributes of the content. As a result, similar pieces of content will have similar hash values associated with them. The more similar the hash values of content are, the more similar the actual content associated with the hash values.

Upon generating a hash value for a received content, a nearest storage bucket(s) can be queried based on the hash value of the received content to determine if a matching hash value is located in the storage bucket. As similar hash values are clustered into similar storage buckets, content can be analyzed quickly and efficiently by comparing hash values against the nearest storage buckets to identify matching content. In particular, as the amount of content grows, each hash value can be rapidly checked for matching content because each incoming hash value will not have to be checked against each hash value in each storage bucket, thus reducing both time and resource usage.

In operation, a hash value associated with the received content can be compared to each hash value in the nearest storage bucket(s). In some cases, a similarity measure (e.g., a distance such as a Jaccard Distance) between the hash value of received content and each hash value in the nearest storage bucket can be determined. For all hash value pairs with a distance above, below, or within a certain similarity measure, a counter value (e.g., client counter value or global counter value) associated with each hash value in storage may be incremented, and the hash value for the received content is added to the nearest storage bucket for future searching. As described, the counter value associated with each hash value in the storage indicates the number of times content has been observed over a period of time defined by a counter expiration value. For example, a user may receive X content Y times in an hour. In some embodiments, the time the data is maintained in the storage may depend on user-defined criteria. For example, the counter value associated with a hash value may be reset to 0 after a period of time indicated by a counter expiration value associated with the counter value.

When hash values with an associated counter value meet or exceed a count threshold, the related content can be flagged as spam. For example, if a hash value of content matches any hash values of content already stored in the bucket, then the counter values increase for each matching hash value in storage until one of the counter values reaches a certain count threshold. Upon reaching the count threshold, the content can be designated as spam. In some embodiments, only the counter values in the nearest storage bucket that are within a certain distance of the received content hash are analyzed.

In some embodiments, both duplicate matching and near-duplicate matching may be performed. For example, a client may configure embodiments described herein to perform duplicate matching prior to performing near-duplicate matching. Advantageously, by checking for exact matches first, embodiments described herein can avoid checking for near-duplicate matches if an exact match already exists.

In other implementations, a user may select when to perform duplicate or near-duplicate matching. For example, a user may configure embodiments described herein to check only for duplicate content. As another example, a user may configure embodiments described herein to check for similar or near-duplicate content in addition to exact matches via duplicate matching. As a result, using duplicate and/or near duplicate detection enables a greater amount of unsolicited content to be detected and filtered based on defined criteria.

Having briefly described an overview of aspects of the present invention, various terms used throughout this description are provided. Although more details regarding various terms are provided throughout this description, general descriptions of some terms are included below to provide a clear understanding of the ideas disclosed herein.

Content generally refers to information or data that is textual, visual, aural, or any combination thereof. Examples of content may include, among other things, text, images, sounds, videos, and animations.

Spam generally refers to any unsolicited content such as, but not limited to, an electronic mail message, photo, video, etc. The content of spam can be anything and may or may not contain legitimate material.

Matching content generally refers to any content that is a duplicate, exact, identical, near-duplicate, similar, comparable, analogous, related and/or any other measure that indicates closes to other content.

Buckets generally refer to storage buckets or any other storage resource.

A hash value is a value that is created using any hashing algorithm that generates a numerical value, letter value, alphanumerical value, or any other value for content that is smaller than the content itself, and is generated by a hashing algorithm in such a way that it is unlikely that different content will produce the same hash value.

Example Spam Detection Environment

Figure 1:
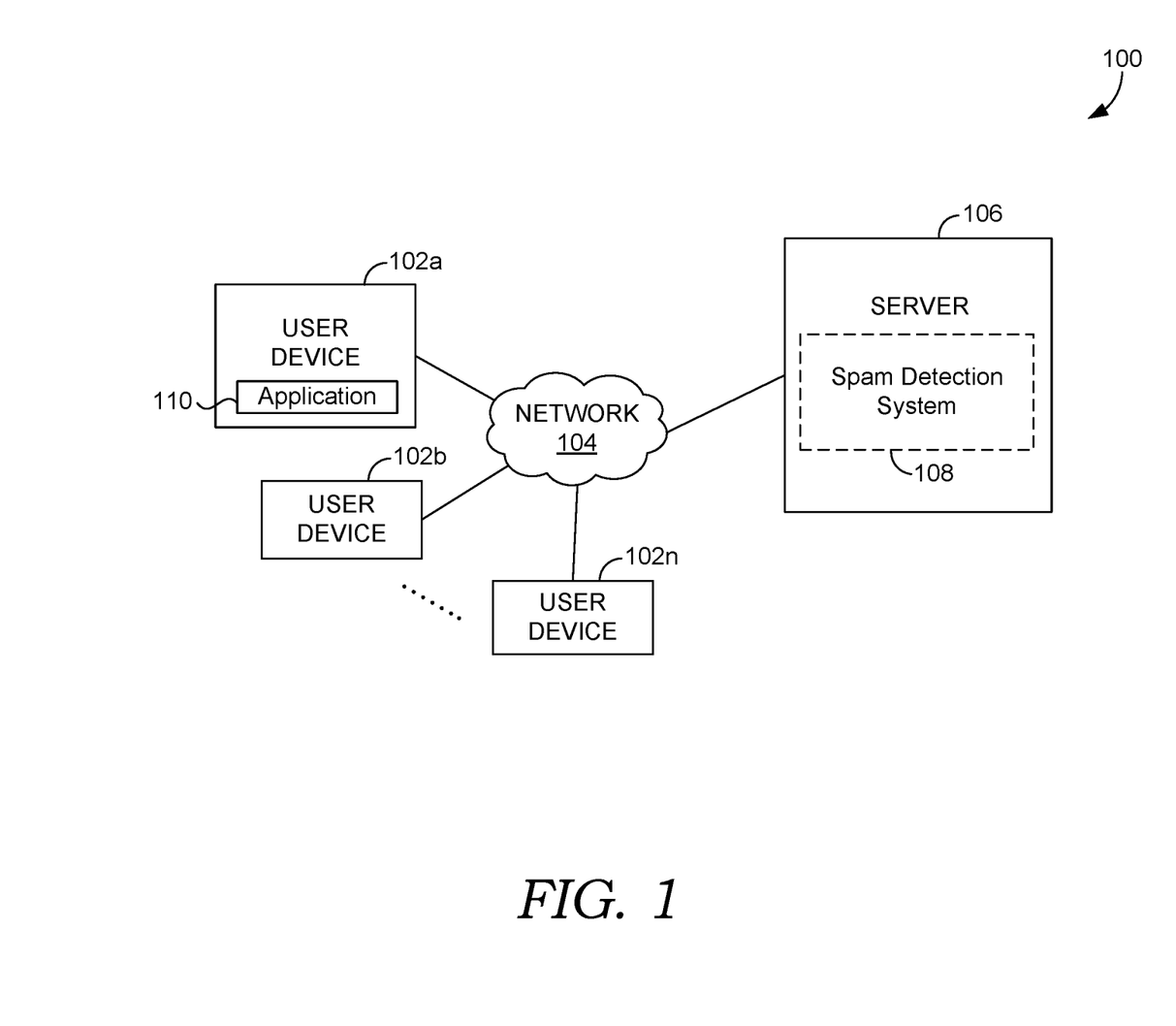
FIG. 1 is a block diagram of an exemplary computing system for facilitating spam detecting, in accordance with embodiments described herein.

FIG. 1 depicts a block diagram of exemplary environment 100 suitable for use in implementing embodiments of the invention. Generally, environment 100 is suitable for facilitating the detection of spam by matching content using hah values. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1 is an example of one suitable operating environment. Among other components not shown, operating environment 100 includes a number of user devices, such as user devices 102a and 102b through 102n, network 104, and server(s) 106. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 for use in spam detection. In some implementations, the application(s) comprises a web application, which can run in a web browser, and could be hosted at least partially on the server-side of environment 100. In addition, or instead, the application(s) can comprise a dedicated application, such as an application having analytics functionality. In some cases, the application is integrated into the operating system (e.g., as a service and/or program). It is therefore contemplated herein that "application" be interpreted broadly. In some embodiments, the application may be integrated with spam detection system 108.

In accordance with embodiments herein, the application 110 can provide content (e.g., to server 106) to be analyzed for spam and/or provide an indication that content is spam (e.g., via presentation to a user of user device 102). By way of example, application 110 can be used to communicate content to another device, which may be analyzed for spam via the spam detection system 108. Further, based on an identification or detection of spam, application 110 can be used to communicate an indication that content is spam to a user of the user device 102a, for instance, when a counter value associated with a hash value of content in the storage bucket meets a count threshold. As can be appreciated, application 110 need not provide the content to the spam detection system in order to obtain indications of spam content, and vice versa. For example, spam detection system 108 may obtain content from various applications and devices to analyze for spam and provide data associated with the identified spam to the application 110 on user device 102a. As another example, application 110 may provide content for spam detection, but reports or data associated with any spam detection may be provided to another application or device.

As described herein, server 106 can facilitate spam detection by comparing hash values of content via spam detection system 108. Server 106 includes one or more processors, and one or more computer-readable media. The computer-readable media includes computer-readable instructions executable by the one or more processors. The instructions may optionally implement one or more components of spam detection system 108, described in additional detail below. It should be appreciated that while spam detection system 108 is depicted as a single system, in embodiments, it can function as multiple systems capable of performing all the attributes of the system as described.

Spam detection system 108 generally detects spam using duplicate and/or near-duplicate detection to determine spam by comparing hash values of content. Generally, spam detection system 108 can be implemented by determining if content being analyzed matches any content stored in storage buckets via direct hash value comparison or comparison of a distance between hash values. Counters associated with stored hash values can be incremented, for example, each time a hash value of content being analyzed is above, below, or within a similarity measure of a stored hash value(s). When the counter value associated with a stored hash value exceeds a threshold, the corresponding content can be designated or indicated as spam.

For cloud-based implementations, the instructions on server 106 may implement one or more components of spam detection system 108. Application 110 may be utilized by a user to interface with the functionality implemented on server(s) 106, such as spam detection system 108. In some cases, application 110 comprises a web browser. Thus, it should be appreciated that spam detection system 108 may be provided via multiple devices arranged in a distributed environment that collectively provide the functionality described herein. Additionally, other components not shown may also be included within the distributed environment. In addition, or instead, spam detection system 108 can be integrated, at least partially, into a user device, such as user device 102a. Furthermore, spam detection system 108 may at least partially be embodied as a cloud computing service.

Figure 2:
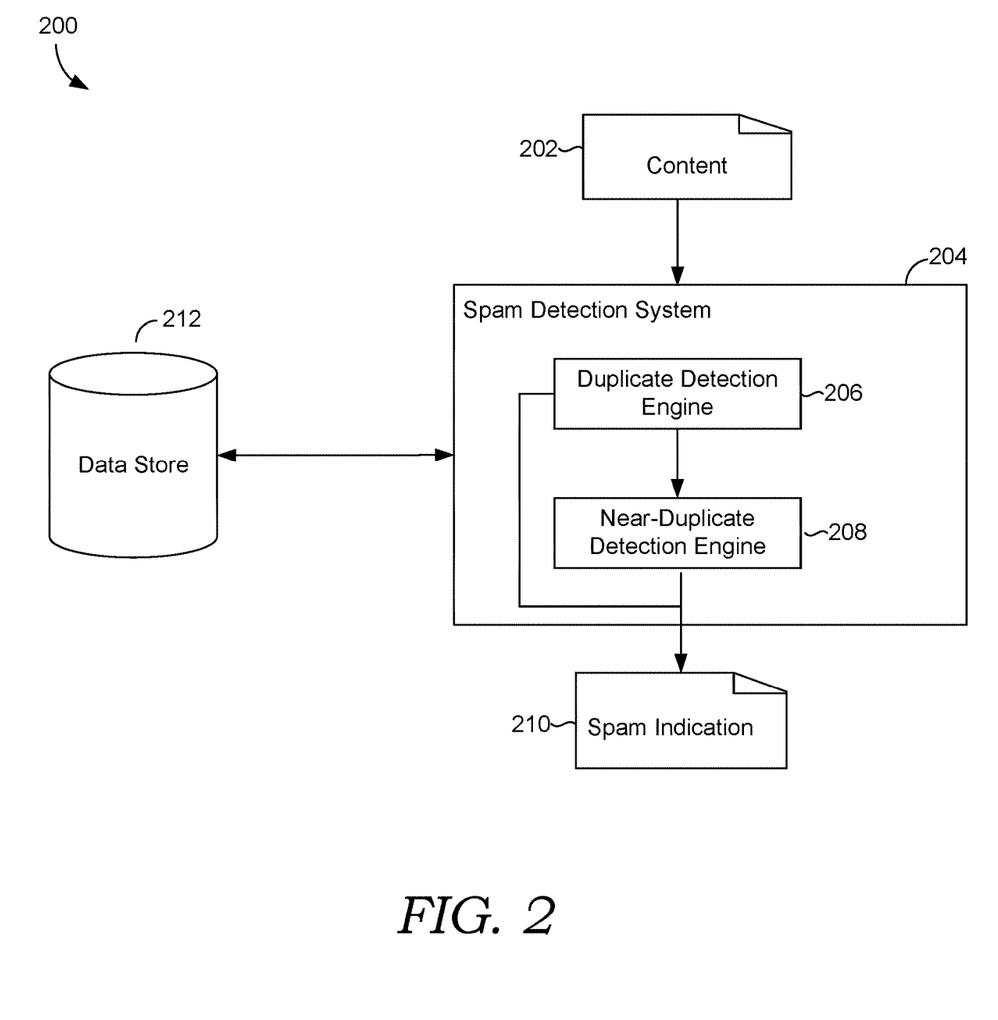
FIG. 2 is a block diagram of an exemplary computing system for facilitating spam detection using duplicate detection and near-duplicate detection, in accordance with embodiments described herein.

Referring to FIG. 2, FIG. 2 provides an illustrative spam detection environment for determining spam by comparing hash values, in accordance with embodiments of the present disclosure. Data store 212 can store computer instructions (e.g., software program instructions, routines, or services), data, and/or models used in embodiments described herein. In some implementations, data store 212 stores content, hash values of content, counter values associated with content, counter expiration values, or other content related information. Although depicted as a single component, data store 212 may be embodied as one or more data stores. Further, the information in data store 212 may be distributed in any suitable manner across one or more data stores for storage (which may be hosted externally).

In embodiments, data stored in data store 212 includes collected content data, hash value data, counter value data, and counter expiration value data. Content data generally refers to any data associated with content. Content generally refers to information or data that is textual, visual, aural, or any combination thereof. As such, content can include, among other things, text, images, videos, sounds, and animations. In general, hash value data refers to a value that is created using any hashing algorithm that generates a numerical value, letter value, alphanumerical value, or any other value for content that is smaller than the content itself, and is generated by a hashing algorithm in such a way that it is unlikely that different content will produce the same hash value. Counter value data refers to any data related to a counter value (e.g., a number of times the associated hash value has been observed, etc.). Counter value data can include client counter values and global counter values. A client counter value refers to the number of times a hash of content in storage has been matched for a particular entity. An entity generally refers to a person, company, organization, or the like. A global counter value refers to the number of times a hash of content in storage has been matched for all entities using spam detection system 204. Counter expiration values generally indicate a specific time or period of time in which the client and global counter values are reset at or after the specified time. One example of the data store is ADOBE® Data Warehouse, which can store collected content data. Content data may also include data related to users and/or customers of a content moderation platform such as the ADOBE® Content Moderation Service and any other data collected from users and/or customers in any suitable manner. In some cases, data, including content data, can be received directly from user devices or from one or more data stores in the cloud.

Spam detection system 204 can determine spam by comparing hash values of content. In some embodiments, spam detection system 204 may use counter values associated with hash values in storage buckets to provide an indication that accessed content is spam. To determine that the accessed content is spam, the spam detection system 204 can compare a hash value for the accessed content with each hash value in a closest storage bucket. The distance between the hash value of the accessed content and each hash value in the storage bucket indicates the similarity of the content based on the similarity of the respective hash values. Subsequently, if the distance is above, below, or within a similarity measure, a counter value associated with each hash value in the storage bucket is incremented. An indication is then communicated that the content is unsolicited content when the counter value associated with at least one of the hash values in the storage buckets meets a count threshold.

To initiate determining spam using duplicate or near-duplicate detection by comparing hash values of content, spam detection system 204 can receive content 202. Content 202 can include text, images, videos, or any other information, data, or metadata that may be unwanted, unsolicited, or undesirable. In some cases, content 202 may be automatically sent to spam detection system 204. For instance, content 202 can be sent automatically when, for example, a particular user, entity, client, customer, website, and/or platform indicates that any content, or any portion of the content, needs to be checked for unwanted, unsolicited, and/or undesirable content. As another example, content 202 may be sent to spam detection system 204 in response to a user selection. For example, content may be sent when a user selects particular incoming content to be checked for unwanted, unsolicited, or undesirable content. In other cases, a user may specify when they wish content to be sent, for instance, by specifying a particular user or a particular time period. For example, content may be sent if the content is directed to a person with the title "CEO." As another example, content may be sent only Monday through Friday during hours set by a user.

Spam detection system 204 can include duplicate detection engine 206 and near-duplicate detection engine 208. The foregoing components of spam detection system 204 can be implemented, for example, in operating environment 100 of FIG. 1. In particular, these components may be integrated into any suitable combination of user devices 102a and 102b through 102n, and server(s) 106.

Duplicate detection engine 206 of spam detection system 204 is generally configured to receive content 202 and determine whether exact matches of content exist in storage by comparing hash values of content. Generally, determining exact matches of hash values of content can be used to identify spam, for example, when an exact match is counted a defined number of times. As previously described, content 202 can include text, images, videos, or any other information, data, or metadata that may be unwanted, unsolicited, or undesirable. As such, duplicate detection engine 206 can receive content and, thereafter, determine exact matches of content by generating a hash value for content to compare the generated hash value with hash values of content in storage.

In embodiments, duplicate detection engine 206 generates a hash value for received content, such as content 202. In some implementations, the hash value of the content is an MD5 hash value. In other implementations, any suitable hash value generator, algorithm, process, or method can be used to generate a hash value for the received content. Such hash values can be any value that is generated based on the content, or portions of content. As such, exact content generates the exact same hash value. Although generally described herein as the duplicate detection engine generating hashes, as can be appreciated, another component (e.g., a hash value generator) may be used to generate hashes for content, such as content 202.

Upon a hash value being generated for content, duplicate detection engine 206 can compare the hash value of received content with the hash values of content in storage. The hashes of content in data store 212 can be obtained in any number of ways. In some cases, duplicate detection engine 206 requests hash values from data store 212 upon receiving content 202. In other cases, data store 212 sends hash values to duplicate detection engine 206 after detecting that content 202 has been sent to spam detection system 204. In some cases, to compare hash values of content, a closest storage bucket is identified and queried using the hash value of received content to determine if a hash value in storage matches the hash value of the received content. In other cases, any lookup or search function may be used to check hash values in storage. As such, the hash value of received content can quickly and efficiently checked for duplicate hash values in storage.

Additionally, a hash value that does not match any stored hash values can be added to storage, such as data store 212. On the other hand, when a hash value matches a stored hash value, duplicate detection engine 206 increments a counter value associated with the matching stored hash. For example, if the hash value generated for the received text "Congratulations! Please click the following link to claim your prize." is a6c5f10c772d63789bc663be4e30c5e5 and there is an exact hash value match in data store 212, a counter value corresponding with the stored hash value can be incremented by one. In some embodiments, each hash value in storage is associated with a client counter value and global counter value. As mentioned above with respect to data store 212, a client counter value refers to the number of times a hash value of content in storage has been matched for a particular entity. An entity generally refers to a person, company, organization, or the like. A global counter value refers to the number of times a hash value of content in storage has been matched for all entities using spam detection system 204. For example, a hash value in storage may have a global counter value of 12 when the hash value has been matched 12 times with received content across all entities. The same hash value in storage may have a client counter value of 3 when the hash value has been matched 3 times from that particular entity. Using such global and client counter values enables content to be identified as spam based on a global counter value or client specific counter value exceeding a threshold.

In accordance with determining that a stored hash value matches the hash value of received content and/or increasing a counter(s) value associated therewith, duplicate detection engine 206 can determine whether a counter value associated with the stored hash value exceeds a count threshold. As described, a count threshold generally refers to a threshold value that, when obtained or exceeded, indicates spam. As can be appreciated, there can be multiple count thresholds, that, when exceed, indicate spam. For example, a client count threshold refers to a threshold value that is associated with a particular entity. As another example, a global count threshold refers to a threshold value that is maintained for all entities of spam detection system 204. When a counter value associated with the stored hash value exceeds a count threshold, the duplicate detection engine 206 can designate or identify the received content, such as content 202, as being spam. By way of example only, assume a client counter value is 34 and the client count threshold is 30. In such a case, the corresponding received content is indicated as spam because the client counter value exceeds the client count threshold associated with the particular entity. In this regard, duplicate detection engine 206 determines exact matches of hash values of content in storage by comparing hash values of content and determining whether a client or global counter value associated with a stored hash value exceeds a count threshold.

Near-duplicate detection engine 208 is generally configured to provide an indication that content is spam by comparing hash values using a similarity measure and determining whether a counter value exceeds a count threshold. Near-duplicate detection engine 208 initially determines the type of content and generates a hash value based on the type of content.

To compare hash values of content, a closest storage bucket is identified and queried using the hash value of received content to determine which hash values in the closest storage bucket are similar based on a similarity measure. The closest storage bucket may be identified by determining a bucket with a range of hash values that correspond with the hash value of received content. For example, a storage bucket may contain metadata indicating a range of hash values stored in the bucket. Thus, the hash value of the received content can be used to locate the bucket with the corresponding range of hash values that contain the hash value of the received content.

Additionally, the storage bucket may be queried and/or searched for hash values that are above, below, or within a similarity measure. The similarity measure is a value or range of values that indicates an extent of similarity and/or dissimilarity of hash values. In some implementations, the similarity measure may be configured differently for each entity. For example, the similarity measure for entity A may be 0.20 and the similarity measure for entity B may be 0.30. In this example, the similarity measure indicates the maximum measure of similarity that is tolerated between two hash values. Thus, if a distance between two hash values exceeds the similarity measure, then it may be determined that the hash values are not similar enough to increment a counter value associated with the hash value in storage. However, if the distance between two hash values is below the similarity measure, then it may be determined that the hash values are similar enough to increment a counter value associated with the hash value in storage. In this regard, the similarity measure is used to determine which hash values meet a degree of similarity.

To determine if two hash values are above, below, or within a similarity measure, a distance may be calculated between each hash value in the closest storage bucket with the generated hash value of received content. It is contemplated that any suitable method, process, or algorithm may be used for measuring the distance between the two hash values (e.g., Jaccard similarity index, etc.). For example, the distance between two hash values may be represented as a value between 0 and 100. In this regard, a smaller distance will have a value closer to zero, and, the closer the distance to zero, the more similar the two hash values. Thus, the similarity of two hash values is calculated based on the distance between the two hash values.

Subsequently, near-duplicate detection engine 208 increments associated client counter values and/or global counter values for each hash value in storage that is above, below, or within a defined similarity measure. The client and global counter values for associated hash values that are above a count threshold provide an indication that the content is unsolicited, unwanted, or undesirable based on the observation rate of similar content. A count threshold generally refers to a minimum number of times a hash value may be observed during a period of time before a spam indication is provided by spam detection system 204. In order to determine the observation rate, the client and global counter values have associated counter expiration values. The counter expiration values indicate a specific time or period of time in which the client and global counter values are reset at or after the specified time. In some cases, the counter expiration values may be configured differently for each entity. For example, the counter expiration values may be set to 24 hours for entity A and another counter expiration values for entity B may be set to 48 hours. This means that every 24 hours the client counter values associated with entity A will be reset to a value of zero and every 48 hours the client counter values associated with entity B will be reset to a value of zero. As such, the observation rate of similar content can be calculated based on the client and global counter values and the associated counter expiration values. For example, if the counter expiration values for entity A is 24 hours and the current client counter value is 48, the current observation rate is 2 observations per hour. Thus, near-duplicate detection engine 208 can identify spam by comparing hash values and incrementing client and global counters of stored hash values that are similar to hash values of received content to provide a spam indication 210 when a client and/or global counter value exceeds a count threshold.

A spam indication 210 maybe provided to an entity based on duplicate engine 206 or near-duplicate engine 208 determining whether any client or global counters for hash values in storage exceed a count threshold. Spam indication 210 is provided to an entity that indicates whether the received content is spam. The provided spam indication 210 may be presented to an entity in any suitable manner. For example, a pop-up box may be generated indicating that received content 202 may be spam. In some embodiments, actions can be taken as a result of spam indication 201. For example, if received content 202 is determined to contain spam via spam indication 210, a client can automatically delete the content from its platform. As another example, a client may accept the received content if spam indication 210 provides that the received content does contain any unwanted, undesirable, or unsolicited content. In this regard, spam indication 210 allows a user or client to take actions regarding whether or not to accept or reject the received content.

In some embodiments, duplicate detection engine 206 may be utilized in conjunction with near-duplicate detection engine 208. In other embodiments, duplicate detection engine 206 and near-duplicate detection engine may operate separately. For example, duplicate detection engine 206 may receive content 202 and determine whether an exact hash value in storage matches a hash value of received content 202 and provide spam indication 210. Based on a user-define setting and/or preference, near-duplicate detection engine 208 may operate after duplicate detection engine 206 or, alternatively, may operate on its own. For example, near-duplicate detection engine may receive content 202 directly or may receive content 202 via duplicate detection engine 206 following determination of any exact matches of hash values in storage. As such, utilizing duplicate detection engine 206 and near-duplicate detection engine 208 can provide better spam indications of received content by checking for exact matches as well as similar matches of content in storage.

Example Flow Diagrams

With reference now to FIGS. 3-6, flow diagrams are provided illustrating methods for determining spam using near-duplicate detection by comparing hashes. Each block of methods 300, 400, 500, and 600, and any other methods described herein, comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The methods 300, 400, 500 and/or 600 may be implemented by spam detection system as described in conjunction with at least FIGS. 1-2.

Figure 3:
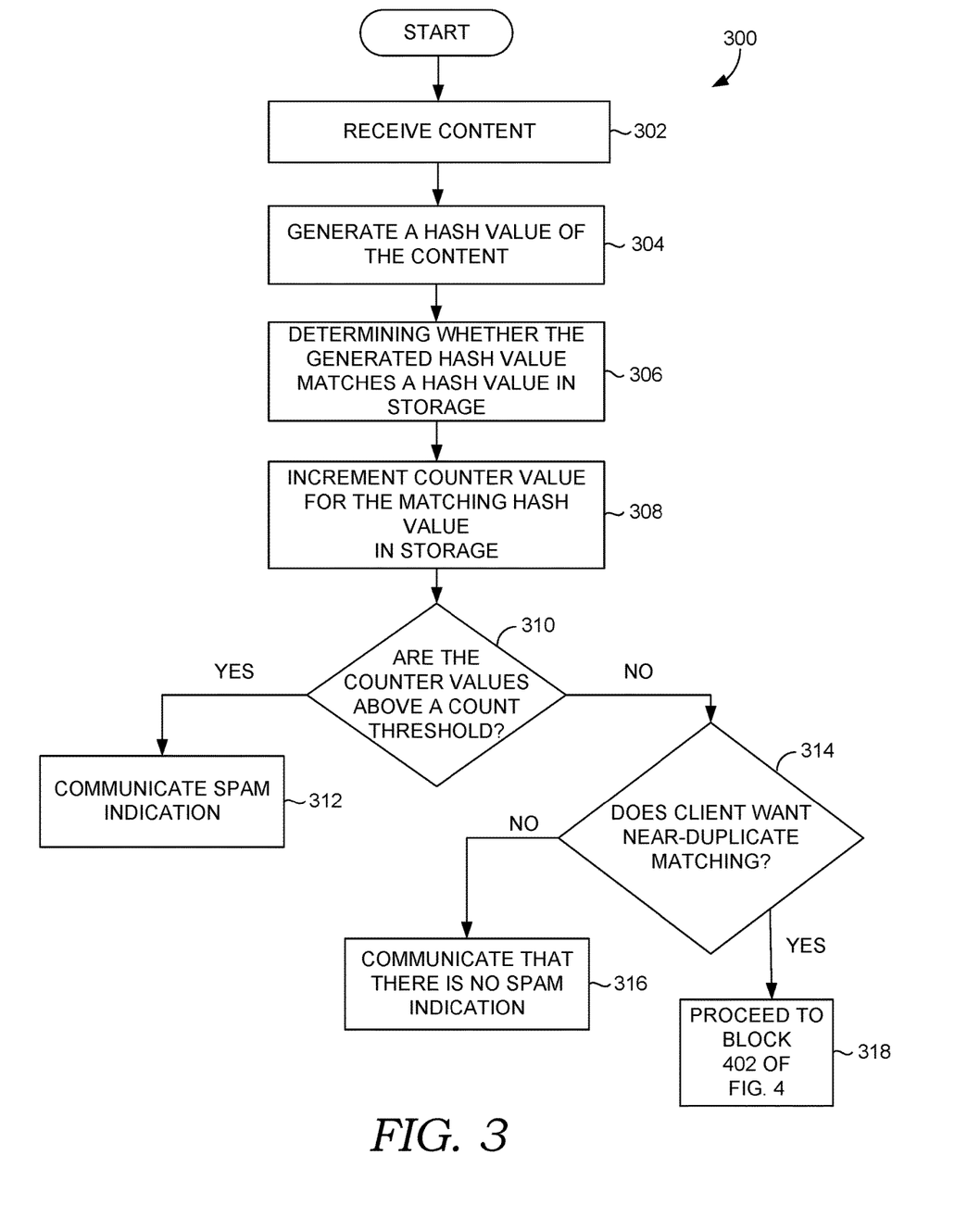
FIG. 3 is a flow diagram showing a method for detecting spam using duplicate detection, in accordance with embodiments described herein.

Referring now to FIG. 3, FIG. 3 is a flow diagram showing a method for detecting spam using duplicate detection, in accordance with embodiments described herein. As depicted, process flow 300, beings at block 302 where content is received. The received content can be any information or content data. In some embodiments, the received content is text content, image content, video content, or any combination. At block 304, a hash value of the received content is generated. The hash value may be generated using any suitable hash function. In some embodiments, an MD5 hash value producing a 128-bit hash value is generated for the received content.

At block 306, it is determined that the generated hash value matches a hash value in storage. In some embodiments, storage buckets are used to store and group similar hash values. For example, a Redis Cache Cluster may be used to store hash values. By storing hash values in storage buckets, the closest storage bucket may be checked for an exact match of the received content hash value. Although not shown for clarity, if there is no matching hash value in storage, the hash value of the received content is added to the appropriate storage bucket so it can be used when new content is received and checked for matching hash values.

At block 308, counter values associated with a matching hash value in storage are incremented. In some embodiments, each hash value in storage has a client counter value and a global counter value. As mentioned above, the client counter refers to the number of times a hash of content in storage has been matched for a particular entity. An entity generally refers to a person, company, organization, or the like. A global counter value refers to the number of times a hash of content in storage has been matched for all entities. For example, if an MD5 hash value of 3d3df93be8489a82343f64e5163354cb for received content by client X exactly matches a hash value already in storage, then a client_X_counter value will get incremented by one. In this regard, if the previous value of the client_X_counter value was 3, it will now be 4. In some cases, a global_counter value associated with the same hash will also get incremented by one. Thus, if the global_counter value was 11, it will now be 12. As such, both counter values are incremented when a match appears although the values may be different based on the frequency of the match for a specific entity and a specific match across all entities.

At block 310, a determination is made as to whether a counter value associated with a matching hash value in storage exceeds a count threshold. Both the client counter value and global counter value can be checked to determine if either exceeds the count threshold. If either counter value exceeds the count threshold, then a spam indication is communicated at block 312. If neither the client counter value nor global counter value exceed the threshold, at block 314, a determination can be made as to whether near-duplication matching is to be performed. In some embodiments, near-duplicate matching may be performed for all received content. In other embodiments, an entity may be prompted to indicate whether near-duplicate matching for the received content is desired. If an entity indicates that near-duplicate matching is not desired, then an indication that the received content is not spam is communicated to the client at block 316. In some implementations, if an entity indicates that near-duplicate matching is not desired, no spam indication may be provided or communicated. However, if an entity indicates that near-duplicate matching is desired, then the process proceeds to block 402 of FIG. 4 where embodiments described herein detect spam using near-duplicate detection.

Figure 4:
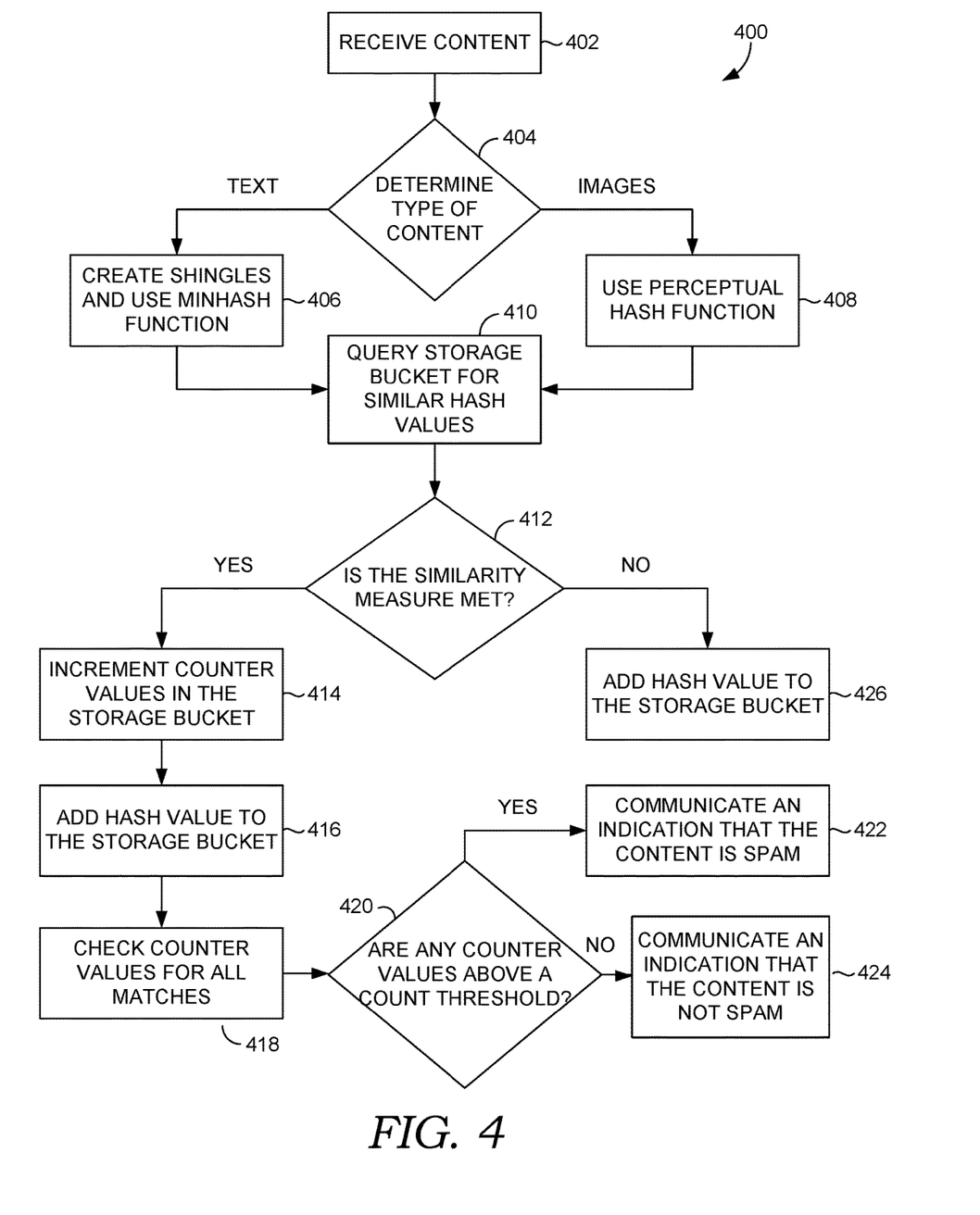
FIG. 4 is a flow diagram showing a method for detecting spam using near-duplicate detection, in accordance with embodiments described herein.

Turning now to FIG. 4, FIG. 4 is a flow diagram showing a method for detecting spam using near-duplicate detection. Initially, at block 402 content is received. As discussed above regarding process 300 of FIG. 3, the received content can be any information or content data. In some embodiments, the received content is text content, image content, video content, or any combination. In some embodiments, the content is received as a result of duplicate detection not identifying spam or receiving a user-indicated desire to perform near-duplicate matching as discussed in conjunction with at least block 314 of process 300 of FIG. 3. In other embodiments, process 400 may begin by receiving content without first checking for duplicate matches via process 300 of FIG. 3.

At block 404, the type of the received content is determined. The type of content can be used to determine which hash function to use to determine if near-duplicate content matches exist. For example, if the received content is textual, then shingles of the text are created and a MinHash function can be used to generate a hash value for the text and subsequently the hash value can be compared to hash values in storage to determine if near-duplicate content exists in a storage bucket. As another example, if the type of content is an image, block 408 can use a perceptual hash function to generate a hash value for the image. The generated hash value of the image can be used for comparison of hash values in storage to determine if near-duplicate content exists in a storage bucket. Although any suitable hash function may be used to generate hash values, the hash functions used may be based on the type of content as more similar hash values can be generated when the content is similar. This allows for quick and efficient comparison of hash values to determine if content is similar.

At block 410, a storage bucket is queried for similar values based on the hash value produced at block 406 or block 408. In embodiments, the closest storage bucket is queried for similar value based on the generated hash value of the received content. The closest storage bucket is determined based on the value of the generated hash. For example, the hash value generated for text content may fall within a range that is maintained by a particular storage bucket. As such, that storage bucket is determined to be the closest and no other storage buckets need to be checked for near-duplicate content.

At block 412, embodiments described herein determine the similarity of hash values in the closest storage bucket with the generated hash value of the received content. To determine the similarity, the distance between each hash value in the closest storage bucket is compared with the generated hash value of the received content. If the distance between a given hash value in the closest storage bucket and the hash value of the received content is above, below, or within a similarity measure, then the process proceeds to block 414. If there are no pairs of hash values with a distance above, below, or within the similarity measure, then the process proceeds to block 426 and the hash value of the generated content is added to the closest storage bucket so it can be used for near-duplicate detection at a later point in time.

At block 414, the counter values associated with each hash value in the closest storage bucket that exceed a distance index are incremented if the distance between the hash value and the received content hash value is above, below, or within a similarity measure. As discussed above in conjunction with process 300 of FIG. 3, in some embodiments, each hash value in storage has a client counter value and a global counter value. The client counter value corresponds to the number or times a hash of content in storage has been matched for a particular entity. In contrast, the global counter value corresponds to the number of times a hash of content in storage has been matched for all entities. As such, both counter values are incremented for a hash value in storage when its distance compared to the hash value of the received content is above, below, or within a similarity measure, although the values may be different based on frequency matching for a specific entity and a specific match across all entity. Accordingly, each counter for each hash value in the storage bucket that is above, below, or within the similarity measure is incremented.

At block 416, the hash value of the generated content is added to the closest storage bucket and, at block 418, the client and global counter values for each hash value in the storage bucket that exceeded the distance index are analyzed to determine if any of the client or global counter values are above a count threshold at block 420. In some cases, all counters for each hash value in a storage bucket may be analyzed to determine if any of the counter values are above a count threshold. At block 420, a determination is made as to whether any of the counter values associated with the hash values in the storage bucket that were above, below, or within the similarity measure meet a count threshold. At block 422, an indication that the received content is spam is communicated if any of the counter values exceed the count threshold. Alternatively, at block 424, an indication that the received content is not spam is communicated if none of the counter values meet the count threshold. Thus, near-duplicate detection is used to indicate spam content.

Figure 5:
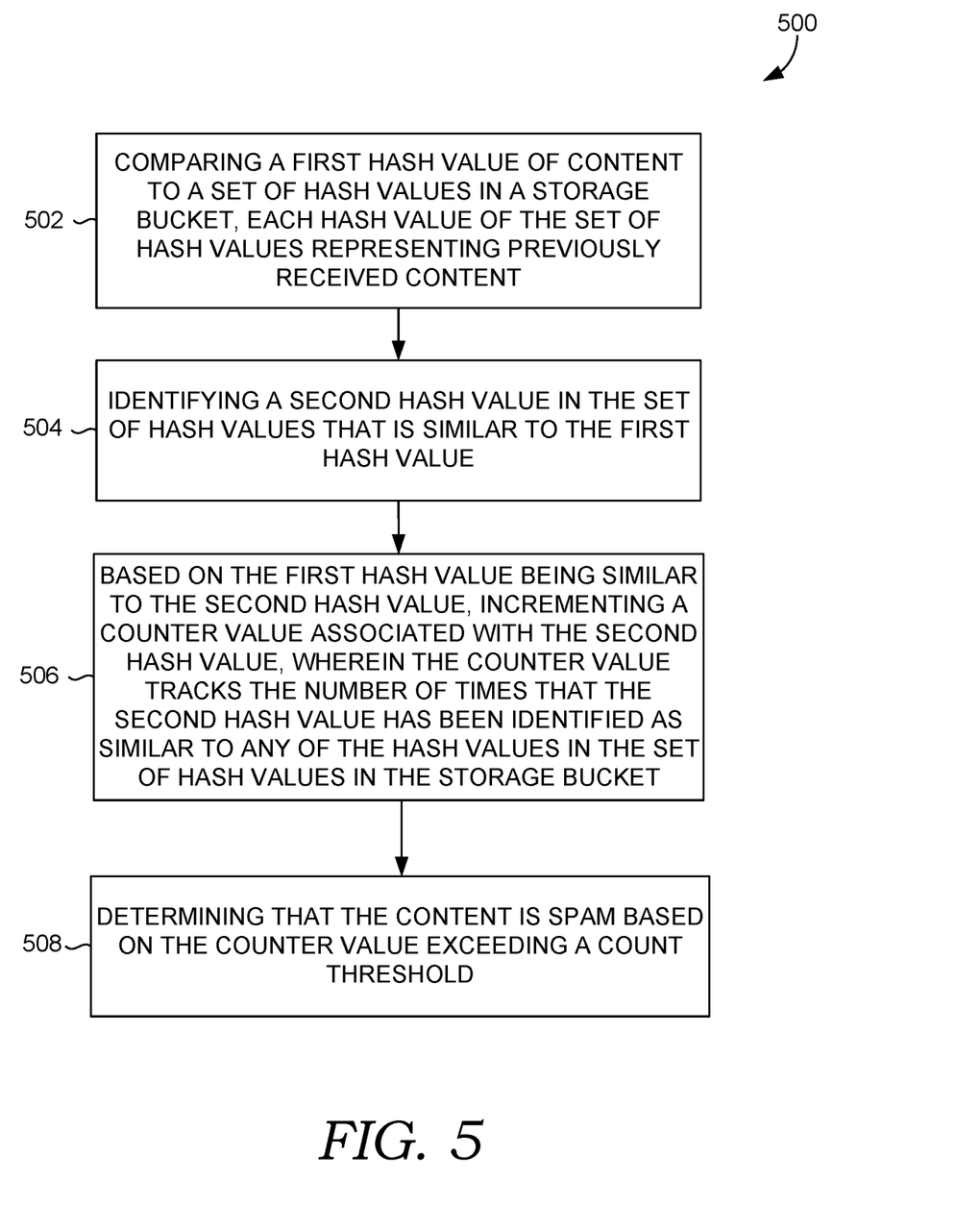
FIG. 5 is a flow diagram showing a method for detecting spam using near-duplicate detection, in accordance with embodiments described herein.

Turning now to FIG. 5, FIG. 5 illustrates a method 500 for determining spam using near-duplicate detection by comparing hash values using a distance index, in accordance with embodiments described herein. Initially at block 502, a first hash value of content is compared to a set of hash values in a storage bucket, each hash value of the set of hash values representing previously received content. At block 504, a second hash value in the set of hash values is identified that is similar to the first hash value. At block 506, a counter value associated with the second hash value is incremented based on the first hash value being similar to the second hash value. The counter value associated with the second hash value at block 506 tracks the number of times that the second hash value has been identified as similar to any of the hash values in the set of hash values in the storage bucket. At block 508, the content is determined to be spam based on the counter value exceeding a count threshold.

Figure 6:
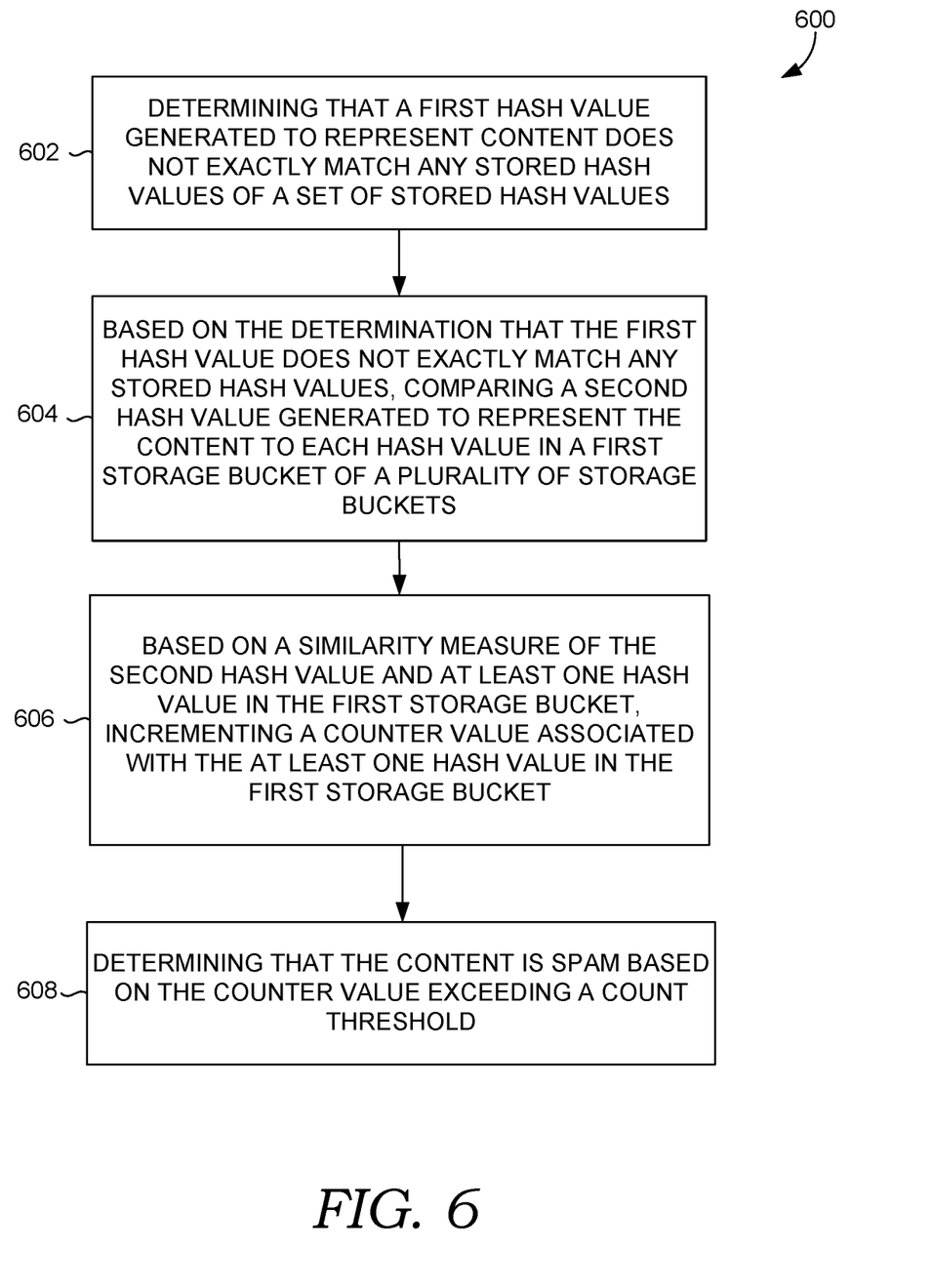
FIG. 6 is a flow diagram showing a method for detecting spam using duplicate detection and near-duplicate detection, in accordance with embodiments described herein.

Turning now to FIG. 6, FIG. 6 illustrates a method 600 for determining spam using duplicate detection by comparing hash values for exact matches and using near-duplicate detection by comparing hash values for similar matches, in accordance with embodiments described herein. Initially at block 602, it is determined that a first hash value generated to represent content does not exactly match any stored hash values of a set of stored hash values. At block 604, a second hash generated to represent the content is compared to each hash value in a first storage bucket of a plurality of storage buckets based on the determination that the first hash value does not exactly match any stored hash values. At block 606, a counter value associated with each of the hash values of the plurality of hash values in the first storage bucket is incremented based on similarity measure of the second hash value and at least one of the hash values in the first storage bucket. At block 608, content is determined to be spam based on the counter value exceeding a count threshold.

Example Operating Environment

Figure 7:
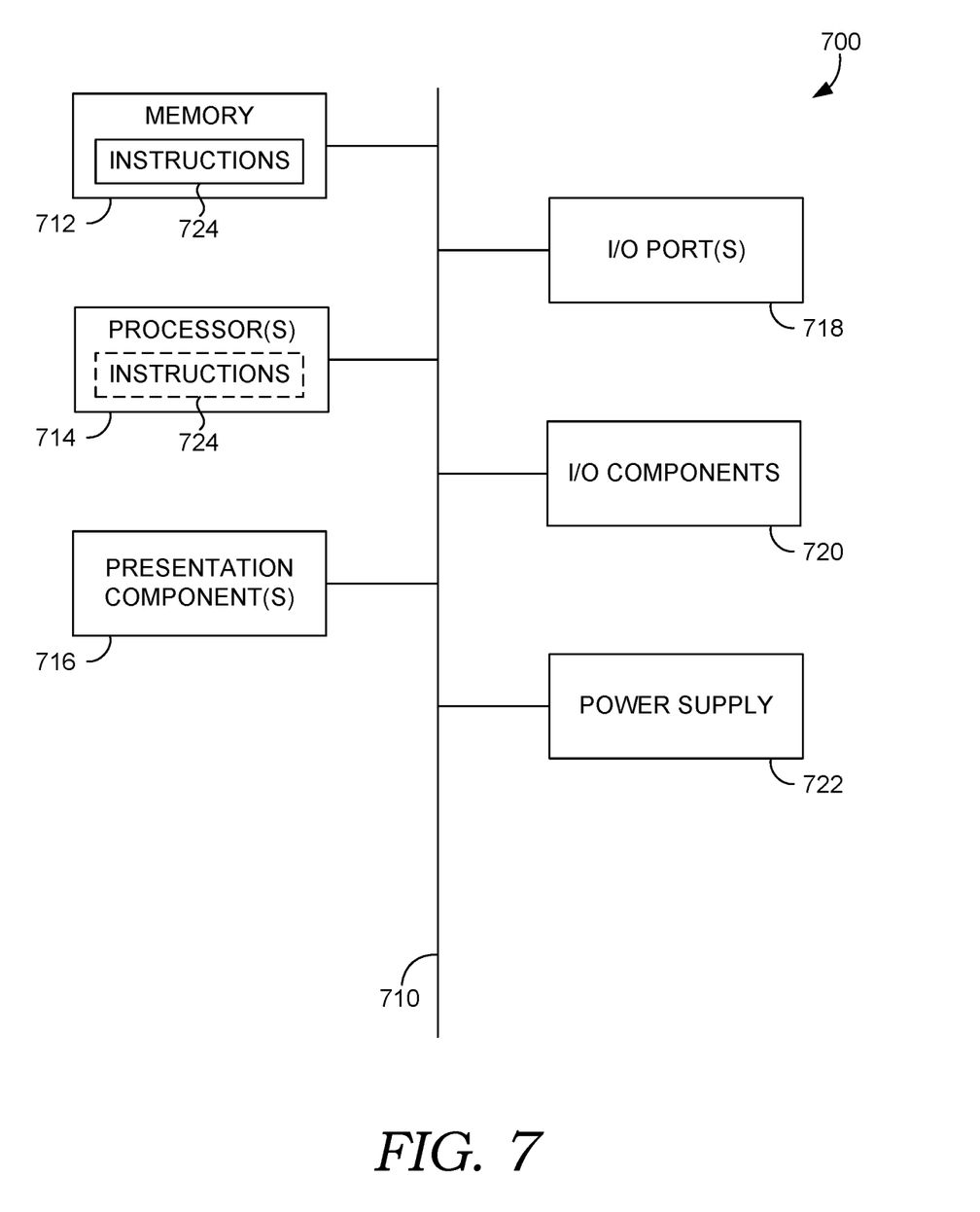
FIG. 7 is a block diagram of an exemplary operating environment in which embodiments described herein may be employed.

Having described an overview of embodiments described herein, an exemplary operating environment in which embodiments described herein may be implemented is described below in order to provide a general context for various aspects of the present invention. Referring now to FIG. 7 in particular, an exemplary operating environment for implementing embodiments described herein is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 910 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments described herein. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 700. Computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of computing device 900 to render immersive augmented reality or virtual reality.

Embodiments described herein support providing factors for explaining the generated results of a DNN. The components described herein refer to integrated components of spam detection system. The integrated components refer to the hardware architecture and software framework that support functionality using the spam detection system. The hardware architecture refers to physical components and interrelationships thereof and the software framework refers to software providing functionality that can be implemented with hardware embodied on a device.

The end-to-end software-based spam detection system can operate within the spam detection system components to operate computer hardware to provide spam detection system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the spam detection system components can manage resources and provide services for the spam detection system functionality. Any other variations and combinations thereof are contemplated with embodiments described herein.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for determining whether content is spam, the method comprising:
    comparing a first hash value of content to a set of hash values in a storage bucket, each hash value of the set of hash values representing previously received content;
    identifying a second hash value in the set of hash values within a measure of similarity to the first hash value;
    based on the first hash value being within the measure of similarity to the second hash value, incrementing a counter value associated with the second hash value, wherein the counter value tracks a number of times that the second hash value has been identified within the measure of similarity to any of the hash values in the set of hash values in the storage bucket, the counter value being associated with a counter expiration that resets the counter value to zero upon expiration of a duration and comprising: (i) a client counter value indicating a number of times content associated with the second hash value has been determined to be spam for a single entity and (ii) a global counter value indicating a number of times content associated with the second hash value has been determined to be spam for any number of entities; and
    determining that the content is spam based on the counter value exceeding a count threshold.

2. The method of claim 1, wherein the storage bucket is identified based on the first hash value being within a range of values corresponding to the set of hash values in the storage bucket.

3. The method of claim 1, wherein the measure of similarity represents a distance between the second hash value and the first hash value.

4. The method of claim 3, wherein the distance is a Jaccard distance.

5. The method of claim 1 further comprising:
    communicating an indication that the content associated with the first hash value is spam based on the counter value exceeding the count threshold.

6. One or more non-transitory computer storage media having computer-useable instructions that, when used by one or more computing devices, cause the one or more computing devices to perform operations comprising:
    determining that a first hash value generated to represent content does not exactly match any stored hash values of a set of stored hash values;
    based on the determination that the first hash value does not exactly match any stored hash values, comparing a second hash value generated to represent the content to each hash value in a first storage bucket of a plurality of storage buckets;
    based on a similarity measure of the second hash value and at least one hash value in the first storage bucket, incrementing a counter value associated with the at least one hash value in the first storage bucket, the counter value being associated with a counter expiration that resets the counter value to zero upon expiration of a duration and comprising: (i) a client counter value indicating a number of times content associated with the second hash value has been determined to be spam for a single entity and (ii) a global counter value indicating a number of times content associated with the second hash value has been determined to be spam for any number of entities;
    determining that the content is spam based on the counter value exceeding a count threshold.

7. The one or more non-transitory computer storage media of claim 6, the operations comprising identifying the storage bucket based on the first hash value being within a range of values corresponding to the set of hash values in the storage bucket.

8. The one or more non-transitory computer storage media of claim 6, wherein the similarity measure between the second hash value and at least one of the hash values in the first storage bucket is based on a distance between the first hash value and the second hash value.

9. The one or more non-transitory computer storage media of claim 6, further comprising:
communicating an indication that the content associated with the second hash value is spam based on the counter value exceeding the count threshold.

10. A computer system comprising:
one or more hardware processors and memory configured to provide computer program instructions to the one or more hardware processors;
a spam detection system configured to use the one or more hardware processors to determine whether content is spam, the spam detection system comprising:
a first means for determining whether a first hash value of content exactly matches a stored hash value of a plurality of stored hash values to determine whether the content is spam; and
a second means for determining whether a second hash value of content is within a measure of similarity to at least one hash value of a set of hash values in a storage bucket, to determine whether the content is spam based on a counter value associated with the second hash value, the counter value being associated with a counter expiration that resets the counter value to zero upon expiration of a duration and comprising: (i) a client counter value indicating a number of times content associated with the second hash value has been determined to be spam for a single entity and (ii) a global counter value indicating a number of times content associated with the second hash value has been determined to be spam for any number of entities.

11. The computer system of claim 10, wherein the second means for determining is configured to identify the storage bucket based on the second hash value being within a range of values corresponding to the set of hash values in the storage bucket.

12. The computer system of claim 10, wherein the second means for determining is configured to:
increment the global counter value associated with each of the hash values in the storage bucket based on a distance between the second hash value and the at least one hash value of the set of hash values.

13. The computer system of claim 12, wherein the second means for determining is configured to:
determine that the global counter value associated with each of the hash values of in the storage bucket exceeds a count threshold.

14. The computer system of claim 10, wherein the spam detection system is configured to communicate an indication that the content is spam based on the counter value exceeding a count threshold.

\* \* \* \* \*